United States Patent

Gross

[11] 3,893,365
[45] July 8, 1975

[54] PLASTIC SCREW GROMMET

[75] Inventor: George E. Gross, Arlington Heights, Ill.

[73] Assignee: Illinois Tool Works Inc., Chicago, Ill.

[22] Filed: Dec. 28, 1973

[21] Appl. No.: 429,620

[52] U.S. Cl. .................................................. 85/80
[51] Int. Cl.² ...................................... F16B 13/04
[58] Field of Search ........ 85/80, 84, 5 R, 82; 151/7, 151/41.75; 24/73 P, 73 PF

[56] References Cited
UNITED STATES PATENTS

| | | | |
|---|---|---|---|
| 2,386,922 | 10/1945 | Andrews et al. | 85/80 |
| 2,836,214 | 5/1958 | Rapata | 85/80 |
| 2,956,605 | 10/1960 | Rapata | 85/80 |
| 3,136,350 | 6/1964 | Rapata | 85/80 |
| 3,747,168 | 7/1973 | Snarskis | 85/9 R X |

*Primary Examiner*—Ramon S. Britts
*Attorney, Agent, or Firm*—Olson, Trexler, Wolters, Bushnell & Fosse, Ltd.

[57] ABSTRACT

A fastening device is disclosed which will not spin even when inserted in a round workpiece aperture. The fastener includes a resinous anchor member having a screw-receiving bore formed at an offset from the anchor shank. The shank surface comprises two frustoconical formations which intersect to form a shoulder; in one embodiment, this locus of intersection is an ellipse. A slot is formed in the anchor shank to permit the shank to expand and engage a surrounding workpiece.

11 Claims, 7 Drawing Figures

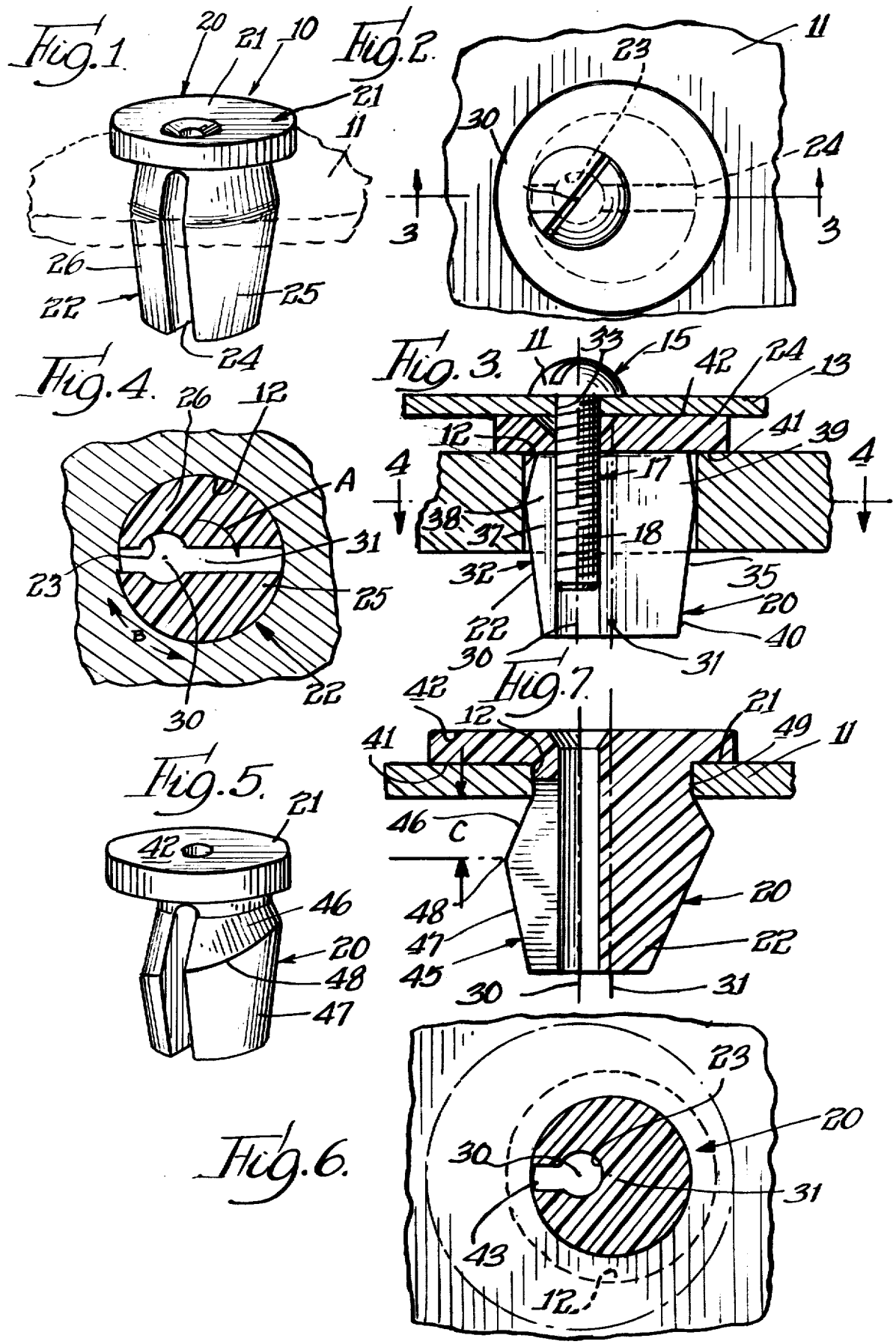

PLASTIC SCREW GROMMET

BACKGROUND OF THE INVENTION

This invention relates generally to fastening devices, and more particularly concerns screw-accepting anchors for joining workpieces.

Screw and nut devices are ubiquitously used throughout industry to join parts. Standard threaded bolt and nut fasteners usually require two tools to effect the connecting operation: after the screw is inserted through one or more workpieces, an anchor nut member is turned on the screw shank. One tool then engages the nut, and a second tool engages either the screw shank or a screw head, usually located upon an opposite workpiece side, and tightening rotation between the nut and screw is provided by the two tools.

A number of successful attempts have been made to eliminate the need for the nut or anchor-engaging tool. In these fastening systems, the anchors are affixed to a surrounding workpiece in some manner before a screw is inserted into the anchor and screw tightening rotation is begun. In some such devices, the anchor member is glued or otherwise adhesively connected to the surrounding workpiece. Other devices provide more or less aggressive, workpiece-engaging surfaces or prongs on the anchors to frictionally engage the surrounding workpiece and prevent anchor rotation. Still others rely upon the geometry of the anchor member and the surrounding workpiece aperture to prevent rotation of the anchor in the workpiece as the screw is turned into the anchor. Some of these devices are disclosed in U.S. Pat. Nos. 2,956,605 and 2,788,047.

To be commercially successful, fastening devices must minimize the number of parts and work operations required in a screw and anchor assembly operation. Thus, the need for adhesives, extra tools or parts is often considered a drawback. Moreover, inadvertent spinning of the anchor in the workpiece caused by improper application of assembly forces to the screw and anchor slows assembly operations and contributes to manufacturing costs, since the assembly operation must be started over again.

It is thus an object of the present invention to provide a fastening device wherein rotation of an anchor member inserted in a workpiece aperture — even a round aperture — is prevented.

A more specific object is to provide a screw and anchor fastening device wherein anchor rotation is prevented without engaging the anchor by a fixing tool, without using adhesive, and without providing an aggressive frictional surface or prongs upon the anchor member.

It is another object of the invention to provide an inexpensive yet effective screw and anchor fastening device which can be used to interconnect two or more workpieces and which can be installed quickly and assembled tightly without the use of more than a screwdriving tool.

Yet another object of the invention is to provide a fastening device wherein the location of the screw-receiving anchor member bore or screw hole can be adjusted through a limited range of positions with respect to the surrounding workpiece.

A further object of the invention is to provide a fastening device including a screw and anchor member wherein the geometry of the anchor member itself is utilized to fix the anchor member in a surrounding workpiece without using adhesive or frictional antimovement surfaces, even when the workpiece is provided with a round anchor-receiving aperture.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a perspective view showing the novel anchor member as it appears when it is inserted in a surrounding workpiece;

FIG. 2 is a plan view of the novel anchor as it appears when it is inserted in a surrounding workpiece and a screw member is inserted therein;

FIG. 3 is a sectional view taken substantially in the plane of line 3—3 of FIG. 2 showing the anchor, the screw, and two workpieces;

FIG. 4 is a sectional view taken substantially in the plane of line 4—4 in FIG. 3 and oriented perpendicularly to the anchor shank axis;

FIG. 5 is a perspective view of an alternate embodiment of the novel anchor member similar to FIG. 1;

FIG. 6 is a plan view of the alternate embodiment similar to FIG. 4; and

FIG. 7 is a sectional view similar to FIG. 3, but taken substantially in the plane of line 7—7 in FIG. 6 and showing in further detail the construction of the alternate embodiment of the novel anchor member.

DETAILED DESCRIPTION

While the invention will be described in connection with preferred embodiments, it will be understood that it is not intended to limit the invention to these embodiments. On the contrary, it is intended to cover all alternatives, modifications, and equivalents as may be included within the spirit and scope of the invention.

Turning first to FIGS. 1–4, there is shown one embodiment of the novel fastening device 10 as it appears when installed in a surrounding workpiece 11 having a round anchor-receiving aperture 12. As shown particularly in FIG. 3, the device 10 can be used to fasten a second workpiece 13 to the first workpiece 11. The illustrated fastening device 10 can be considered to include a screw member 15 having an enlarged head 16 and an axially elongated shank 17 which is provided with threads 18 in a usual manner.

In accordance with one aspect of the invention, the fastening device 10 further includes a novel anchor member 20 having a radially enlarged head 21 at one end and an axially elongated resilient shank 22 which is adapted to be secured in the workpiece aperture 12 and which will not spin in the surrounding workpiece 11. It is a feature of this invention that the anchor member 20 can be inexpensively fabricated from a resinous thermoplastic material such as those sold under the trademarks "nylon", "delrin", and "noryl".

Extending entirely through the anchor 20 is a bore 23. The diameter of this bore 23 is selected to be initially smaller than the diameter of the mating screw shank 17. Thus, when the screw 15 is turned into the bore 23, complementary threads are at least temporarily formed upon the surface of the bore 23 to provide a secure screw-anchor interconnection. Moreover, as the screw 15 is turned into the anchor bore 23, the anchor shank 22 is slightly and resiliently expanded, which causes the anchor shank 22 to more firmly engage the surrounding workpiece 11. This engagement inhibits the anchor 20 from turning in the aperture 12 when engaged by the screw 15.

It is a feature of the invention that expansion of the anchor shank 22 is further encouraged by a shank-dividing planar slot 24. As the screw 15 is turned into the anchor 20, anchor shank portions 25 and 26 spread from one another, more tightly engaging the round aperture 12. In the illustrated embodiment, shank spreading action and resilient screw-anchor interengagement are both promoted by orienting the slot 24 to intersect the screw bore 23. Here, this slot 24 has a width less than the anchor bore diameter, as seen in FIG. 4 and elsewhere, and extends diametrically across the shank 22.

In accordance with another aspect of the invention, rotation of the anchor 20 within the workpiece aperture 12 is inhibited by yet another geometrical arrangement of the anchor 20. More specifically, the anchor bore 23 is formed with its central axis 30 spaced apart from the central axis 31 of the anchor shank 22. This offset location of the bore 23 locates the screw 15 at an eccentric position relative to the anchor shank 22. Now, when the screw 15 is inserted through an aperture 33 in the second workpiece 13, and is then turned into the anchor 20, rotation of the anchor shank 22 relative to the surrounding first workpiece 11 is inhibited. As the screw 15 is threadedly inserted into the anchor 20, rotational torque forces are exerted against the anchor in the direction indicated by the arrow A in FIG. 4. However, since the screw is being inserted along the bore axis 30 which is offset with respect to the anchor axis 31, neutralizing anti-rotational forces are exerted against the anchor shank 22 by workpiece pressure against the shank side in the general region of the arrow B. In the illustrated embodiment, the bore axis and the shank axis are oriented substantially parallel to one another and are spaced apart by at least one half the diameter of the bore.

In accordance with yet another aspect of the invention, easy insertion and secure retention of the anchor 20 in the workpiece 11 is enhanced by the shape of the anchor shank 22. To this end, the surface of the shank is defined by two intersecting frustoconical surfaces 34 and 35. These surfaces intersect at a locus 37, which defines a relatively enlarged shoulder 38 located intermediate relatively reduced shank end portions 39 and 40. The reduced size of the lower end portion 40 encourages initial location and insertion of the anchor 20 into the workpiece aperture 12, and the relatively enlarged shoulder portion 38 and adjacent sloping surface 34 discourage withdrawal of the shank 22 from the workpiece 11 after the anchor 20 has been fully inserted. In the first embodiment, the locus of intersection 37 is a circle, whose plane is oriented perpendicularly to the shank axis 31.

An alternative embodiment of the novel anchor 20 is shown in FIGS. 5-7, inclusive. Here, the anchor 20 is provided with a round head 21 extending substantially equally in all directions from the bore axis 30. So orienting the head 21 provides a more usual and polished appearance to the anchor and any inserted screw when they are located in their assembled positions. Like the first embodiment head 21, two opposed planar surfaces 41 and 42 are provided to abut the two workpieces 11 and 12. A slot is provided, which here does not extend completely through the shank 20. Limited expansion of the shank 22 and consequent aperture engagement during screw insertion thus occurs.

In this embodiment, a shank surface 45 is at least partly defined by two intersecting frustoconical surfaces 46 and 47 which intersect at a locus 48. This locus defines an ellipse, when viewed in the plane of the locus oriented at an acute angle to the shank axis 31, as can be understood from examination of FIGS. 5 and 7. This locus 48 reaches downwardly along the shank 22 for a distance C equal to or less than one half the diameter of the screw. If desired, a cylindrical seat surface 49 can be provided immediately adjacent the head 21 to extend part way along the depth of the workpiece aperture 12.

Adjustment of the location of the screw-receiving bore 24 through a limited range of positions can be accomplished by simply rotating the anchor member 20 within the surrounding workpiece 11 before inserting the screw 15 therein.

After location, the screw 15 is urged into the anchor 20, and a camming action occurs as the anchor shank 22 is urged to rotate within the surrounding workpiece 11. As will be understood, this anti-rotational camming action is similar to that which prevents rotation of the first embodiment of the fastening anchor.

The invention is claimed as follows:

1. A fastening device for use in a workpiece having a round aperture therein, said device including a head and an integral, axially elongated, resilient shank having a generally circular cross-section for intimate acceptance within said aperture, shoulder means located intermediate the ends of said shank for engagement with one surface of the workpiece while said head engages the other surface, a bore traversing said head and a substantial portion of said shank, said bore having an initial diameter smaller than the diameter of a mating screw to cause the shank inserted in said aperture to resiliently expand and engage the surrounding workpiece when the screw is forced along the bore, the bore further having its axis offset and spread-apart from the central axis of the shank an amount sufficient to locate said bore at an eccentric position totally to one side of said shank axis to thereby inhibit rotation of the circular shank in the round workpiece aperture as the screw is turned into the bore.

2. A fastening device according to claim 1 wherein the shank is longitudinally divided by at least one slot extending at least partially across said shank in a diametric direction.

3. A fastening device according to claim 1 wherein the shank is longitudinally bifurcated by at least one slot having a width less than the bore diameter, said slot extending diametrically across said shank and intersecting the bore.

4. A fastening device according to claim 1 wherein said bore axis and said shank axis are substantially parallel and are spaced apart by an amount greater than one-half the diameter of the bore.

5. A fastening device according to claim 1, the surface of said shank is at least partly defined by two intersecting frustoconical surfaces, the locus of intersection defining said shoulder means as an inclined shank shoulder.

6. A fastening device according to claim 5 wherein said locus of intersection is a circle when viewed in a plane oriented perpendicularly to the shank axis.

7. A fastening device according to claim 5 wherein said locus of intersection is an ellipse when viewed in a plane oriented at an acute angle to the shank axis.

8. A fastening device according to claim 7 wherein the locus of frustoconical intersection extends away from the head end of said shank for a distance at least equal to one half said initial bore diameter.

9. A fastening device according to claim 1 wherein said head is adapted to abuttingly engage a second workpiece above the head, said second workpiece having a screw shank-locating aperture located congruently with said anchor bore for preventing translational movement of the screw as it is forced into the bore.

10. A fastening device according to claim 1 wherein said device is formed of a resinous plastic.

11. A fastening device according to claim 1 including a thread-forming screw having a head and a shank of an outer diameter larger than said fastening device unthreaded bore to assure complimentary thread convolution engagement between the screw and the anchor, the length and diameter of said screw shank being sufficient to cause outward flexing of the fastening device as the screw shank is forced into the fastening device bore, said fastening device shank flexing outwardly and frictionally engaging the first surrounding workpiece and thereby inhibiting rotation of the fastening device in the workpiece.

* * * * *